United States Patent
Pimpinella et al.

(10) Patent No.: US 9,201,197 B2
(45) Date of Patent: Dec. 1, 2015

(54) MULTI-CHANNEL, MULTI-PORT OPTICAL TAP COUPLER

(71) Applicant: Panduit Corp., Tinley Park, IL (US)

(72) Inventors: Richard J. Pimpinella, Frankfort, IL (US); Jose M. Castro, Naperville, IL (US); Bulent Kose, Burr Ridge, IL (US); Brett Lane, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/020,984

(22) Filed: Sep. 9, 2013

(65) Prior Publication Data

US 2015/0071586 A1    Mar. 12, 2015

(51) Int. Cl.
| | |
|---|---|
| G02B 6/26 | (2006.01) |
| G02B 6/42 | (2006.01) |
| G02B 6/293 | (2006.01) |
| G02B 6/32 | (2006.01) |
| G02B 6/36 | (2006.01) |
| G02B 3/00 | (2006.01) |

(52) U.S. Cl.
CPC ............ *G02B 6/264* (2013.01); *G02B 6/29379* (2013.01); *G02B 6/29385* (2013.01); *G02B 6/32* (2013.01); *G02B 3/0087* (2013.01); *G02B 6/3636* (2013.01); *G02B 6/3644* (2013.01)

(58) Field of Classification Search
CPC ......... G02B 6/264; G02B 6/32; G02B 6/3636
USPC .................. 385/16, 17, 20, 24, 47, 48, 50, 52
See application file for complete search history.

(56) References Cited

U.S. PATENT DOCUMENTS

| | | | |
|---|---|---|---|
| 4,111,522 A | 9/1978 | Auracher et al. | |
| 4,213,677 A | 7/1980 | Sugimoto et al. | |
| 4,732,449 A | 3/1988 | Fan | |
| 4,733,931 A | 3/1988 | Fan | |
| 5,943,454 A * | 8/1999 | Aksyuk et al. | 385/22 |
| 6,055,347 A * | 4/2000 | Li et al. | 385/34 |
| 6,433,924 B1 | 8/2002 | Sommer | |
| 6,438,291 B1 | 8/2002 | Duck et al. | |
| 6,744,944 B2 * | 6/2004 | Matsuura et al. | 385/24 |
| 6,771,426 B2 | 8/2004 | Yamamoto et al. | |

FOREIGN PATENT DOCUMENTS

| | | |
|---|---|---|
| JP | 2002196284 A | 7/2002 |
| JP | 2005136033 A | 11/2005 |

* cited by examiner

*Primary Examiner* — Ryan Lepisto
(74) *Attorney, Agent, or Firm* — Christopher S. Clancy; Christopher K. Marlow

(57) ABSTRACT

A multi-channel, multi-port optical tap coupler with an alignment base element, a pair of sub-assemblies located at opposite ends of the alignment base element, focusing elements located next to each sub-assembly, and an optical filter adjacent to, and in-between the focusing elements is described. The first sub-assembly has an array of waveguides with each waveguide having a radial offset and an azimuthal position with respect to a center axis of the array. The first array includes transmission waveguides and receiving waveguides and each receiving waveguide has a corresponding transmission wave guide that is separated by an azimuthal angle of 180 degrees. The second sub-assembly has a second array of waveguides including a wave guide having the same radial offset and the same azimuthal position for each of the transmission wave guides of the first array.

2 Claims, 7 Drawing Sheets

MULTI-CHANNEL, MULTI-PORT OPTICAL TAP COUPLER

FIELD OF THE INVENTION

The present invention relates generally optical tap couplers and more specifically to a multi-channel, multi-port optical tap coupler.

BACKGROUND OF THE INVENTION

The use of optical fiber for the transmission of communication signals is rapidly growing in importance due to its high bandwidth, low attenuation, and other distinct advantages such as radiation immunity, small size, and light weight. In optical communication networks, it is often necessary or desirable to split the optical signal into parts having either predetermined proportions of the original signal intensity in order to monitor the state of the communication system, or to split optical frequencies for multiplexing independent signals. A device having the capability of extracting a portion of the optical signal intensity from a communication channel is herein referred to as an optical tap coupler, and a device capable of combining or separating optical frequency components in an optical communications signal is herein referred to as a wavelength division multiplexer (WDM).

Presently, and in future optical networks, the desired properties of optical tap couplers include tight control of the proportions of the split optical signals, low insertion loss, and minimizing variations in modal and polarization states as well as signal spectrum. In addition, in communication systems where higher data rates are achieved by transmitting aggregated data rates over parallel fibers, it is important to reduce the form factor of optical tap couplers in order to achieve high density in optical networks employing the monitoring function.

State of the art optical tap couplers do not provide the means of achieving all of the above mentioned desirable characteristics. The most commonly used technology based on fused biconical tapered optical fibers are spectral and modal dependent. Therefore, when these tap couplers are installed in optical networks utilizing multimode fiber a significant degradation in the network performance results. Other optical taps technologies based on lensing and filtering technology have reduced or negligible degradation on network performance; however, they require multiple components to support channels operating over parallel transmission lanes. Deploying multiple optical tap couplers for channels utilizing parallel optics significantly increases system cost and size, while reducing channel reliability. In practice, size and cost scale with the number of parallel fibers. For example, the transmission of 100 Gbps Ethernet over 10 parallel lanes of multimode fiber (100GBASE-SR10), utilizing full duplex optical tap couplers based on filter technology, requires more than 40 lenses, 20 filters, and other multiple components.

SUMMARY OF THE INVENTION

This application describes a multi-channel, multi-port optical tap coupler with an alignment base element, a pair of sub-assemblies located at opposite ends of the alignment base element, a pair of focusing elements, and an optical filter. The first sub-assembly has an array of waveguides with each waveguide having a radial offset and an azimuthal position with respect to a center axis of the array. The first array includes at least two transmission waveguides and at least two receiving waveguides and each receiving waveguide has a corresponding transmission waveguide that is separated by an azimuthal angle of 180 degrees. The second sub-assembly has a second array of waveguides including a waveguide having the same radial offset and the same azimuthal position for each of the transmission waveguides of the first array. The first and second focusing elements are adjacent to the first and second sub-assemblies, respectively and an optical filter is located adjacent to, and in between, the first and second focusing elements.

DETAILED DESCRIPTION OF THE PREFERRED EMBODIMENTS

Figure 1:
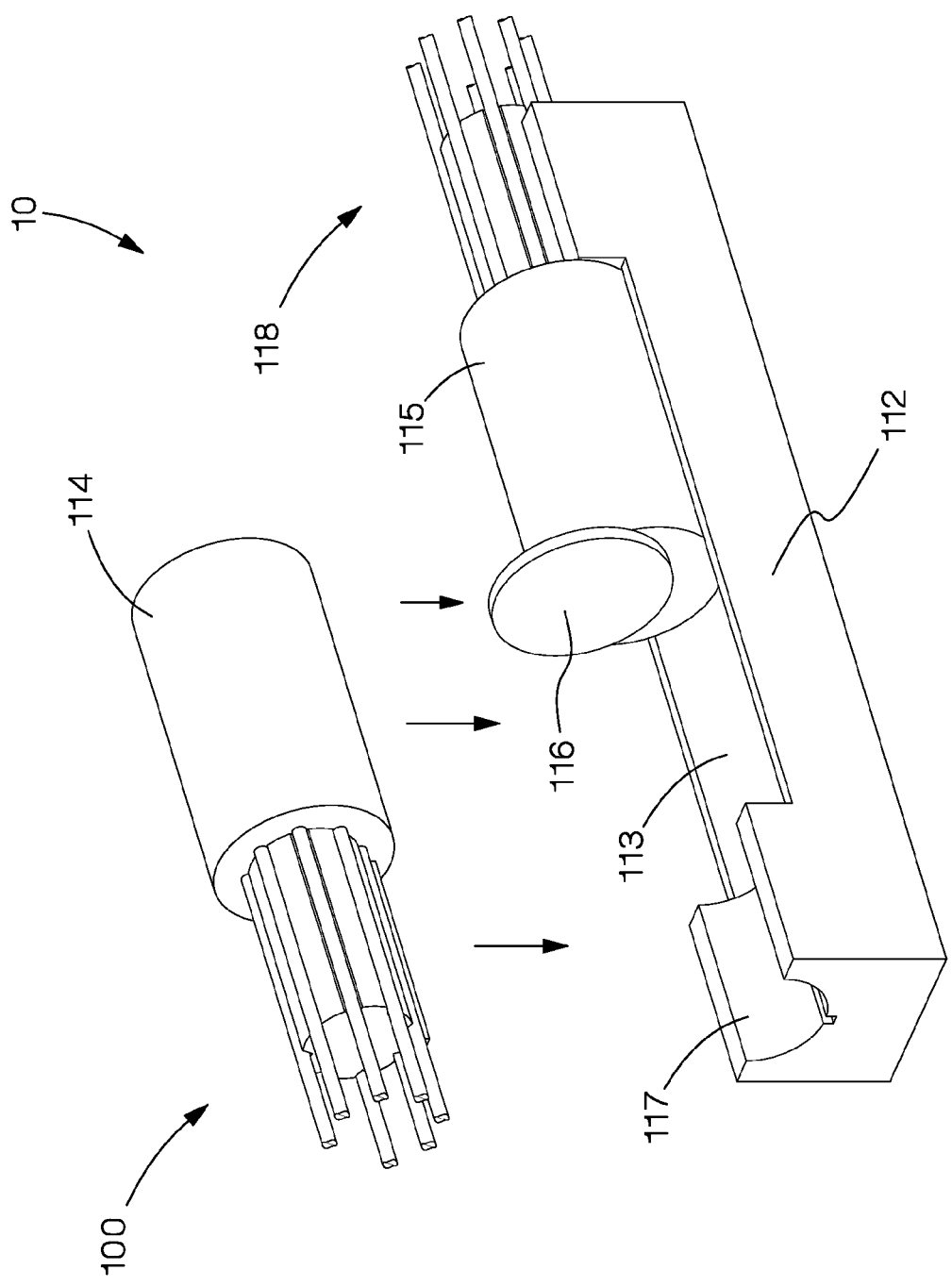
FIG. 1 shows a partially-exploded perspective view of a first embodiment of a multi-channel, multi-port optical tap coupler.

FIG. 1 shows one embodiment of a multi-channel, multi-port optical tap coupler 10. The optical tap coupler 10 has two mechanical sub-assemblies 100, 118, an alignment base element 112, focusing elements (GRIN lenses 114, 115), and an optical filter 116. The alignment base element 112 can have a V-groove 113 or other means for enabling passive optical alignment of the GRIN lenses 114, 115 to the central axis of the device, and receiving features 117 to enable passive optical alignment of the sub-assemblies 100, 116.

Figure 2:
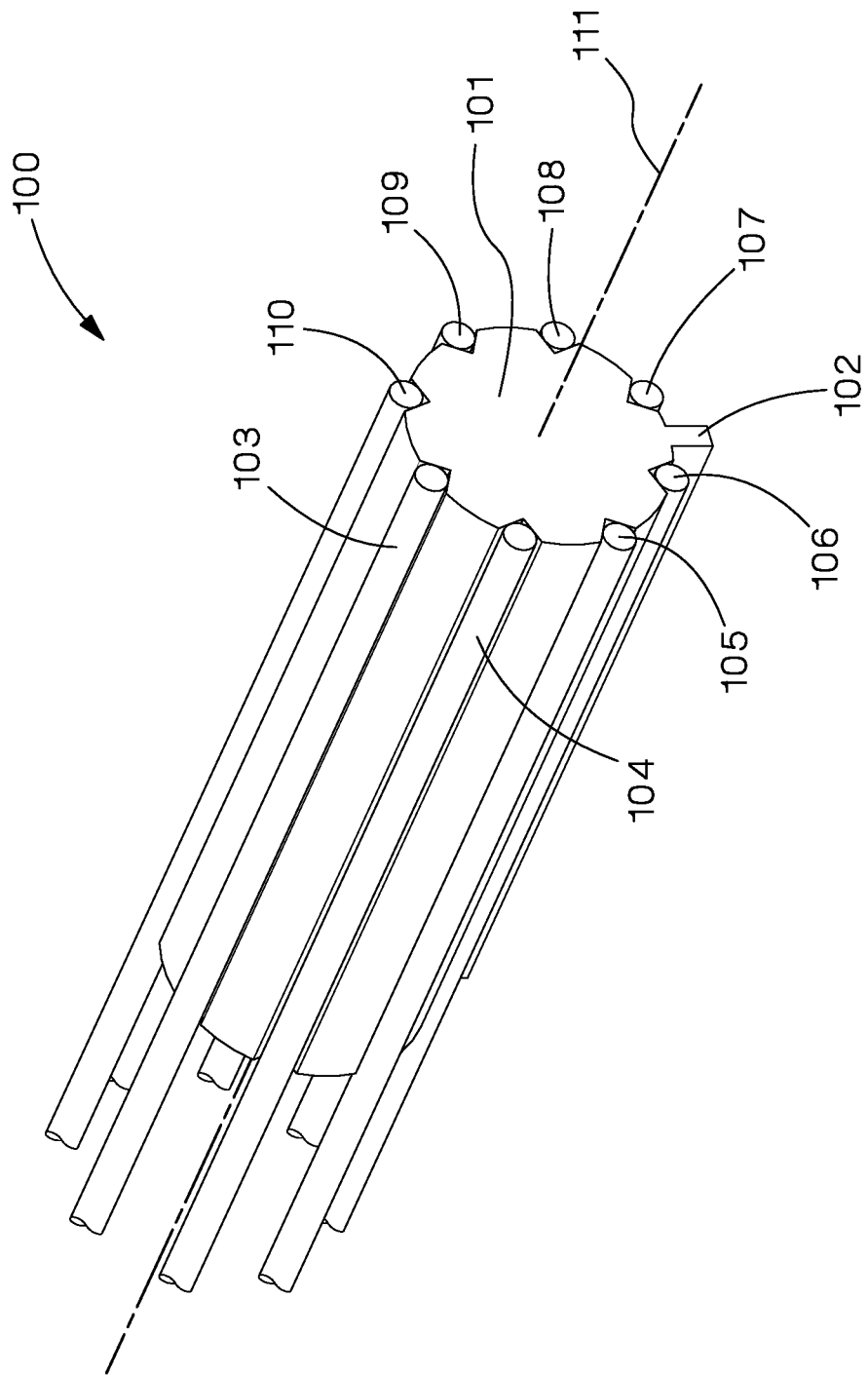
FIG. 2 shows a perspective view of a sub-assembly for the multi-channel, multi-port optical tap coupler of FIG. 1.

FIG. 2 shows an exemplary mechanical sub-assembly 100, comprising a supporting member 101, a mechanical alignment feature 102, and a means of supporting four input (103, 104, 105, 106) and four output (107, 108, 109, 110) optical transmission elements or fiber waveguides with controlled radial and azimuthal positions relative to the center axis 111.

Figure 3:
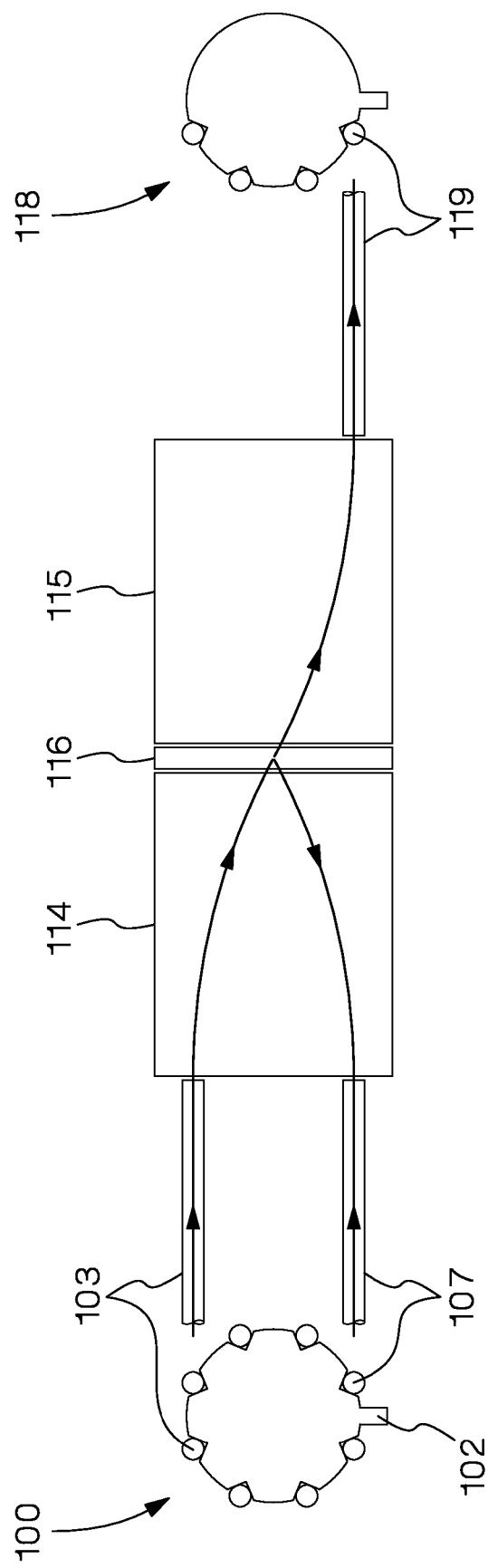
FIG. 3 shows the optical coupling for a single set of waveguides for the multi-channel, multi-port optical tap coupler of FIG. 1.

FIG. 3 shows the optical coupling for a single set of fiber waveguides, where the communications input signal waveguide 103 from the first sub-assembly 100 is focused by the ¼ pitch GRIN lens 114 onto the optical filter 116 where a portion of the signal is reflected by the optical filter 116 to a receiving waveguide 107 also located in the first sub-assembly 100, and the remaining portion is transmitted into the second ¼ pitch GRIN lens 115 where the signal is lensed into a receiving waveguide 119 (symmetrically positioned in the second sub-assembly 118).

Figure 4:
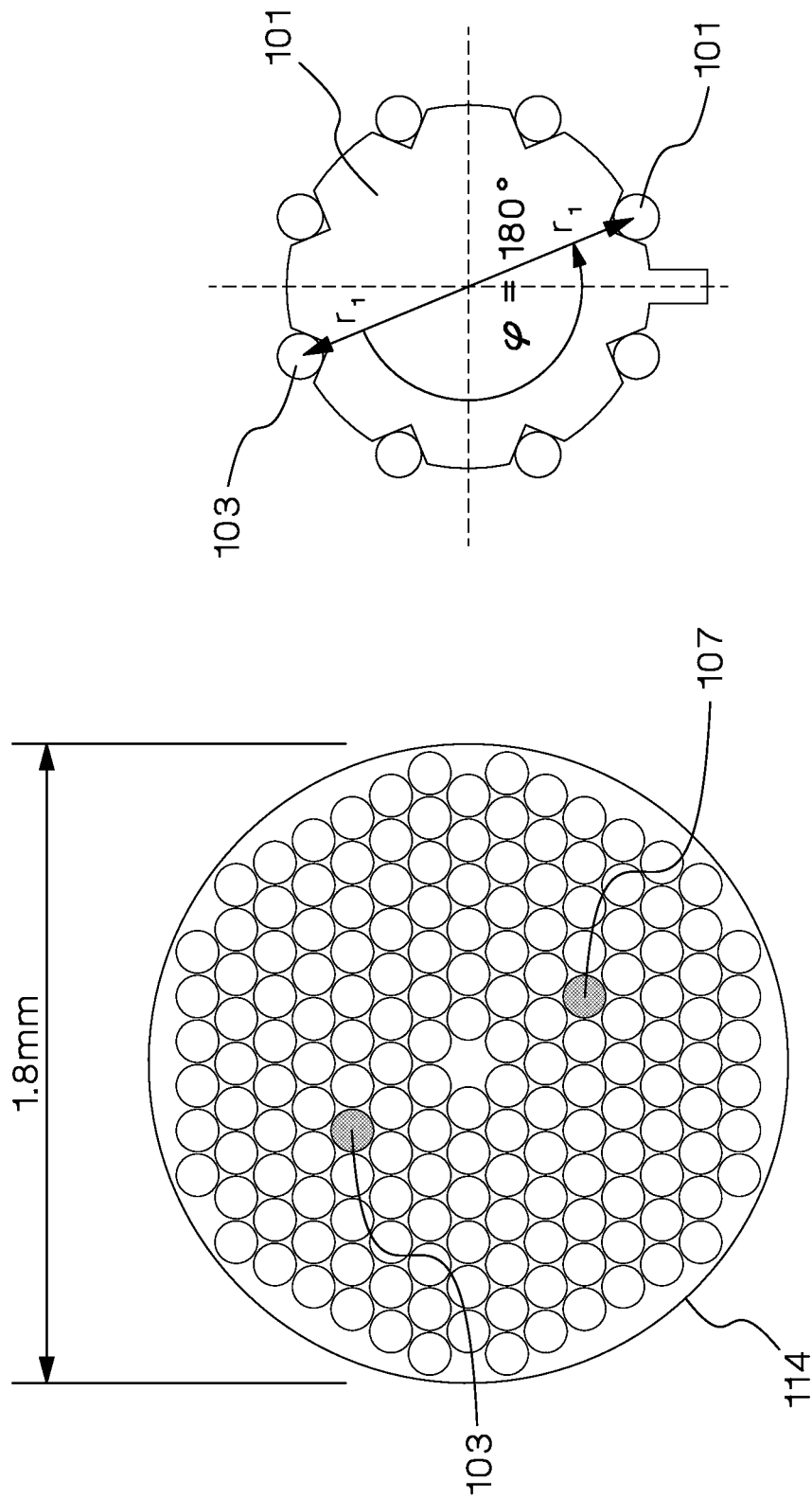
FIG. 4 shows the large number of optical taps that can be achieved using a typically sized GRIN lens.

According to the principals of the present invention, any pair of input and output waveguides in the first sub-assembly 100 are parallel to a central longitudinal optic axis with equal radial offsets, and separated by an azimuthal angle of 180 degrees. Depending on the diameter of the GRIN lenses, the diameter and separation of the waveguides, large numbers of optical taps can be achieved in a single multichannel-multiport tap coupler. For example, for a typical GRIN lens having a diameter of 1.8 mm and optical fibers having an outer cladding diameter 125 µm, a maximum of 162 fiber waveguides can be positioned in a hexagonal close packed configuration as shown in FIG. 4. In this example, the optical device would support 81 discrete communication channels having 81 input waveguides and 81 output waveguides or tap elements in the first sub-assembly 100. The second sub-assembly 118 would contain 81 through output waveguides or taps positioned with equal radial offsets from the optic axis and having mirrored azimuthal symmetry with respect to the output waveguides contained in the first sub-assembly 100.

Figure 5:
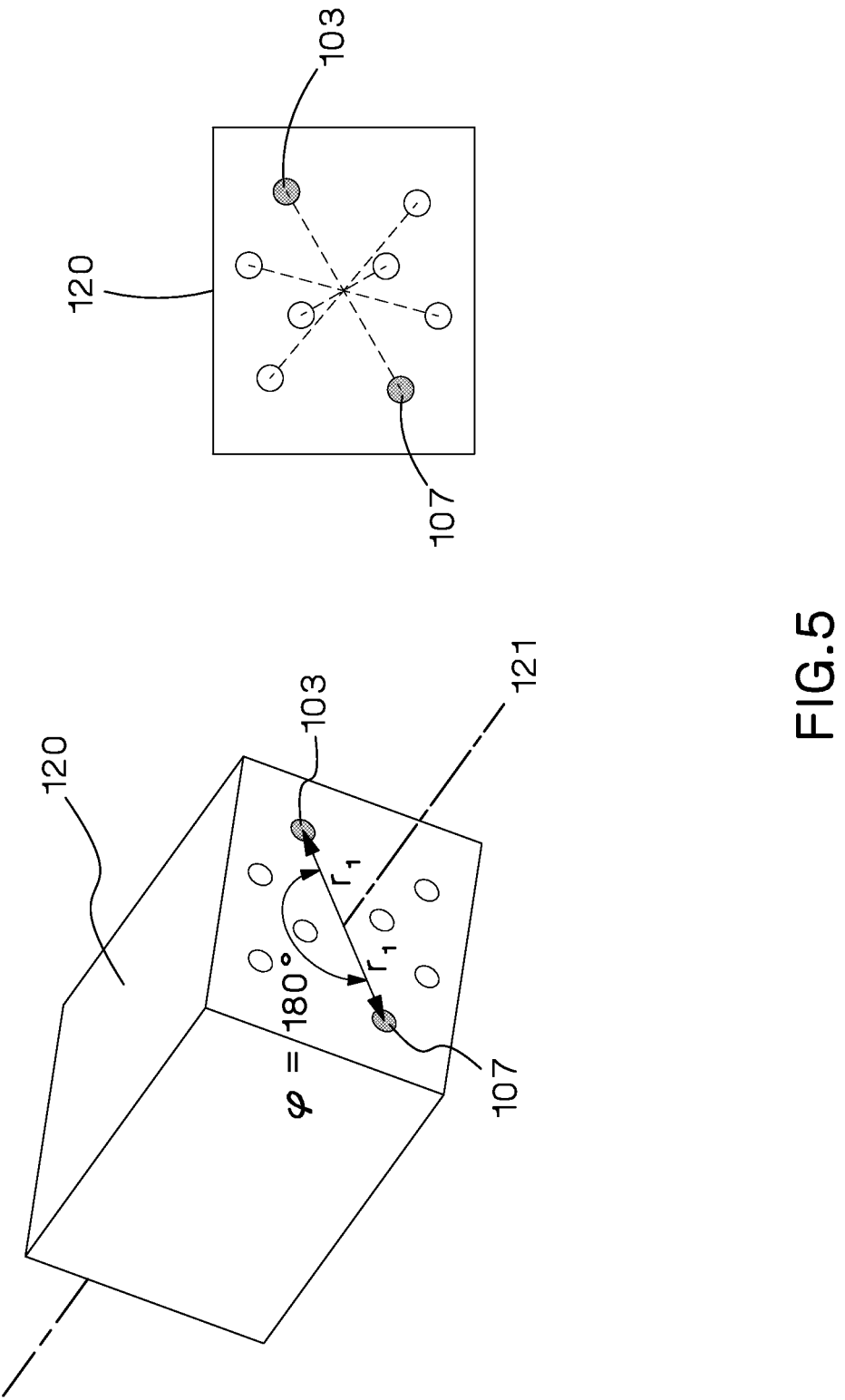
FIG. 5 are perspective and frontal views of a second embodiment of a sub-assembly for a multi-channel, multi-port optical tap coupler.

Although the specific exemplary embodiment shown in this invention depicts a multichannel, multiport optical tap coupler where the waveguides are arrayed with circular symmetry, it is understood that various modifications may be made without departing from the spirit of this invention. FIG. 5 shows an array of four first and second waveguides in a first sub-assembly 120, where the first sub-assembly 120 is block-shaped and where the fiber waveguides are supported in an array of bored holes. In this example, the first and second fiber waveguide for each independent channel are located with a different radial offset from center optic axis 121. The first fiber waveguide 103 and the second fiber waveguide 107 are a distance r1 from the optic axis.

The first and second fiber waveguides 103, 107 are separated by an azimuthal angle of 180 degrees with respect to the center optic axis 121 in the first sub-assembly 120. The third fiber waveguide element contained in the second sub-assembly (not shown) is located with the same radial distance from the optic axis as the first and second fiber waveguides in the first sub-assembly 120, but mirrored relative to the first transmission fiber waveguide 103.

Figure 6:
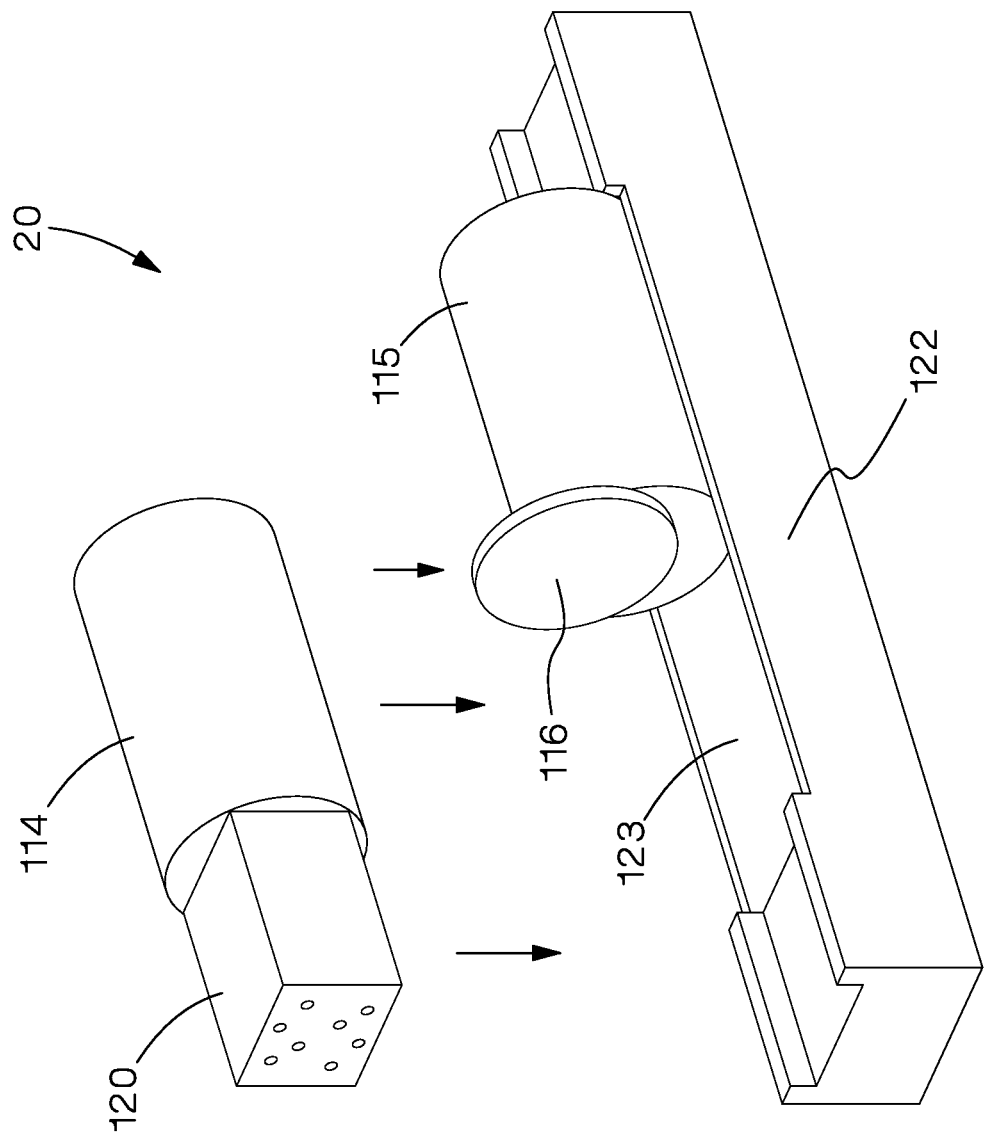
FIG. 6 is a partially exploded perspective view of second embodiment of a multi-channel, multi-port optical tap coupler using the sub-assembly of FIG. 5.

FIG. 6 shows a second embodiment of a multi-channel, multiport optical tap coupler 20 using the sub-assembly 120 from FIG. 5 with an exemplary alignment base element 122 with a center V-groove 123 for receiving the GRIN lenses 114, 115 and an optical filter 116. The second sub-assembly is not shown.

Figure 7:
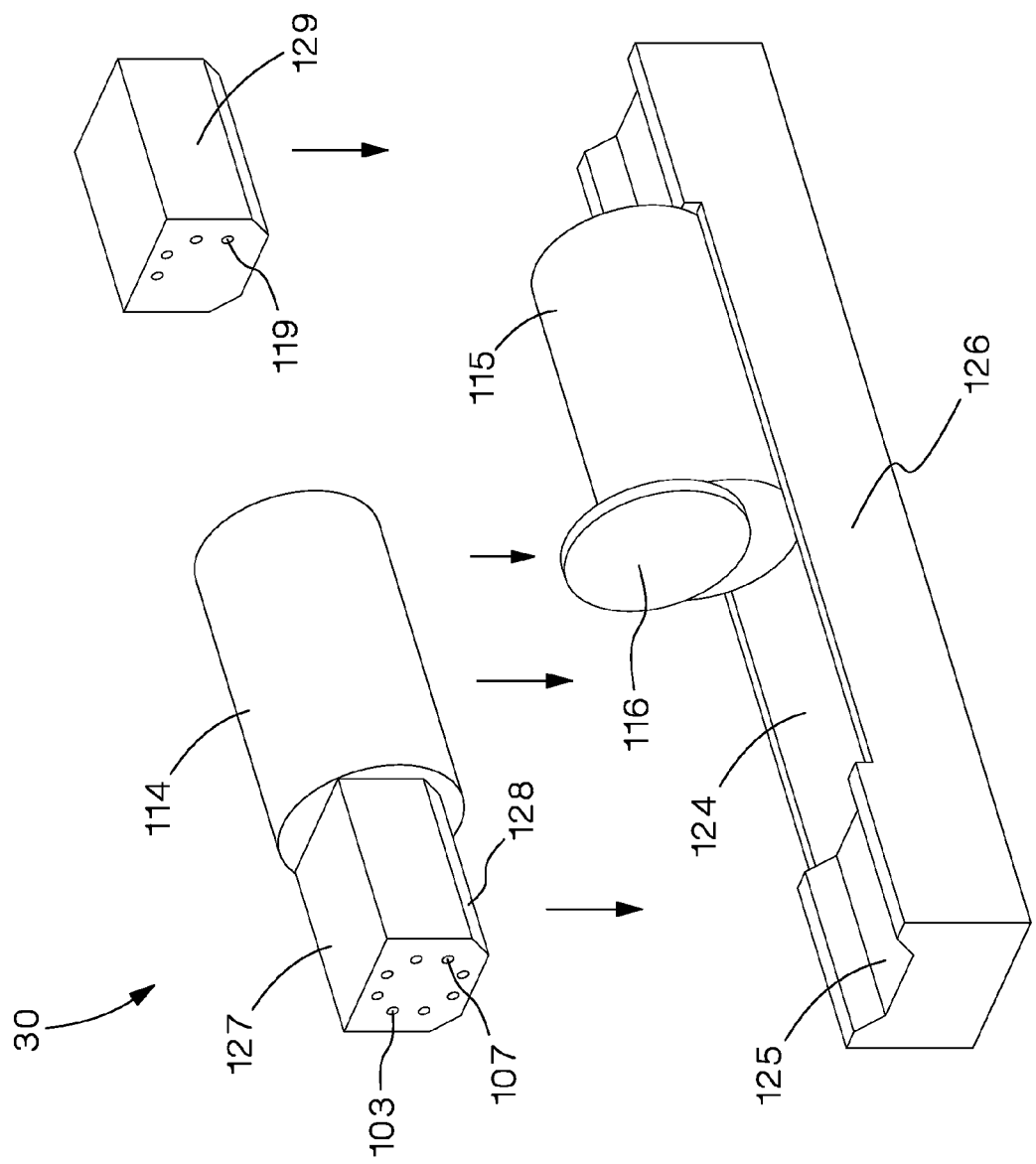
FIG. 7 is a partially exploded perspective view of a third embodiment of a multi-channel, multi-port optical tap coupler.

Referring to FIG. 7, a primary object and aim of this invention is the provision of a method for manufacturing a multichannel, multiport optical tap coupler which is simple, highly accurate, and inexpensive to practice. FIG. 7 shows a third embodiment of a multi-channel, multiport optical tap coupler 30. Utilizing top down assembly methods, the alignment base element or housing 126, GRIN lenses 114, 115 with interposed optical filter 116, and waveguide sub-assemblies 127, 129 are joined together into unitary relationship. The support base element 126 has a relatively large V-groove or channel 124 extending along the surface between opposite edges for receiving the GRIN lenses 114, 115, and the optical filter 116. The two sub-assemblies 127, 129 (with fiber waveguides 103, 107 and 119), can include a mechanical feature for alignment to alignment base element 126. For example, chamfered edges 128 can be utilized and sized to mate to a pair of receiving V-grooves 125 in the alignment base element 126.

Once assembled into a unitary device, the sub-assemblies 127, 129, GRIN lenses 114, 115, and optical filter 116 are all collinear with their central axes aligned. With the device components all in proper relationship to one another, a quantity of an epoxy is then applied to the mating surfaces of the sub-assemblies 127, 129, GRINS lenses 114, 115, and optical filter 116. Therefore, no active signal measurement is required in the assembly of the device.

The relative dimensions of the waveguide sub-assemblies and the support base element are such that the components can be fabricated in plastic utilizing precision injection molding manufacturing methods. Also, once the optical fiber waveguides are joined to their sub-assembly, the fiber endfaces can be cleaved and polished utilizing standard fiber optic connector polishing processes.

As an alternative version of this invention, the optical filter may be replaced with a dichronic filter, which reflects certain frequency components of the transmission signal while transmitting the remaining frequencies. In this way there is not only an intensity proportioning obtained, but also a separation of frequency components onto different optical fiber waveguides. A device according to the principals of this invention having a dichronic filter is a multichannel WDM.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed is:

1. A multi-channel, multi-port optical tap coupler comprising:
  an alignment base element;
  a first sub-assembly at a first end of the alignment base element, the first sub-assembly having a first array of waveguides, each waveguide having a radial offset and an azimuthal position with respect to a center axis of the first array of waveguides and wherein the array of waveguides includes at least two transmission waveguides and at least two receiving waveguides and each receiving waveguide of the array of waveguides has a corresponding transmission wave guide that is separated by an azimuthal angle of 180 degrees;
  a second sub-assembly at a second, opposing end of the alignment base element, the second sub-assembly having a second array of waveguides, the second array of waveguides including a waveguide having the same radial offset and the same azimuthal position as each of the transmission wave guides of the first array of wave guides wherein each of the first and second sub-assemblies comprises a generally cylindrical supporting member surrounded by a plurality of optical transmission elements;
  first and second focusing elements, the first focusing element adjacent to the first sub-assembly and on the alignment base element and the second focusing element adjacent to the second sub-assembly and on the alignment base element;
  a reflective filter configured to reflect a predetermined amount of light and to transmit a predetermined amount of light, the reflective filter located on the alignment base element adjacent to, and in-between, the first and second focusing elements, wherein the first and second sub-assemblies further comprise a mechanical alignment feature configured to engage corresponding receiving features on the alignment base element and wherein the base further has a v-shaped groove, the v-shaped groove and mechanical features configured to axially align the first and second sub-assemblies, the first and second focusing elements, and the reflective filter.

2. The multi-channel, multi-port optical tap coupler of claim 1 wherein the optical filter is a dichronic filter.

* * * * *